United States Patent
Lu et al.

(10) Patent No.: US 10,409,013 B1
(45) Date of Patent: Sep. 10, 2019

(54) OPTICAL FIBER MODULE

(71) Applicant: ORANGETEK CORPORATION, Changhua County (TW)

(72) Inventors: Guan-Fu Lu, Changhua County (TW); Chun-Yi Yeh, Changhua County (TW); Chun-Chieh Chen, Changhua County (TW); Chao-Hui Kuo, Changhua County (TW)

(73) Assignee: ORANGETEK CORPORATION, Changhua County (TW)

( * ) Notice: Subject to any disclaimer, the term of this patent is extended or adjusted under 35 U.S.C. 154(b) by 0 days.

(21) Appl. No.: 16/152,571

(22) Filed: Oct. 5, 2018

(51) Int. Cl.
*G02B 6/293* (2006.01)
*G02B 6/42* (2006.01)

(52) U.S. Cl.
CPC ....... *G02B 6/4215* (2013.01); *G02B 6/29365* (2013.01); *G02B 6/29367* (2013.01); *G02B 6/423* (2013.01); *G02B 6/4206* (2013.01); *G02B 6/4214* (2013.01); *G02B 6/4259* (2013.01)

(58) Field of Classification Search
None
See application file for complete search history.

(56) References Cited

U.S. PATENT DOCUMENTS

| | | | |
|---|---|---|---|
| 7,272,323 B2 * | 9/2007 | Grann | H04B 10/40 398/135 |
| 2001/0026663 A1 * | 10/2001 | Kim | G02B 6/29358 385/76 |
| 2004/0101247 A1 * | 5/2004 | Chen | G02B 6/29367 385/47 |
| 2011/0058771 A1 * | 3/2011 | Lee | G02B 6/4215 385/33 |
| 2013/0168537 A1 * | 7/2013 | Shin | G02B 6/4206 250/216 |
| 2015/0110493 A1 | 4/2015 | Appleyard et al. | |
| 2016/0323038 A1 * | 11/2016 | Zhou | H04B 10/40 |
| 2017/0048015 A1 * | 2/2017 | O'Daniel | G02B 6/4219 |
| 2018/0149817 A1 * | 5/2018 | Vallance | G02B 6/4251 |

\* cited by examiner

*Primary Examiner* — Michael Stahl

(57) ABSTRACT

An optical fiber module includes a main body and at least one optical conducting set. One surface of the main body is formed with a recess set and an accommodation groove, the main body is formed with a reflection slot and a lens slot, disposed with a lens set on a surface of the lens slot, and disposed with a third lens close to the accommodation groove; the optical conducting set is disposed in the accommodation groove and includes a base material and at least one optical conducting member, one surface of the base material is formed with an optical pervious plane close to the third lens which is substantially corresponding to the optical pervious plane, the optical conducting member are formed on two surfaces of the base materials, and can allow a light source with different wavelengths to pass and allow light sources with other wavelengths to be reflected.

21 Claims, 14 Drawing Sheets

OPTICAL FIBER MODULE

BACKGROUND OF THE INVENTION

Field of the Invention

The present invention relates to a technology field of optical conduction, especially to an optical fiber module suitable to be applied in wavelength division of planar-type laser.

Description of Related Art

U.S. Patent Application NO. 20150110493A1 has disclosed an optical fiber module which is suitable to be applied in wavelength division for optical path, but the optical components disposed inside the optical fiber module (such as a collimating lens, a filter plate and a reflection plane) are all defined as coplanar optical paths, so that the height of the module is increased, and the whole optical fiber module cannot be miniaturized.

SUMMARY OF THE INVENTION

The applicant of the present invention has devoted himself to improve the following disadvantage. When the above-mention optical fiber module is in actual use, the multiple channel and the multiple wavelengths are designed as coplanar optical paths, so that an objective of enabling the height of the optical fiber module to be lowered by utilizing the wavelength division, thus a technology issue of miniaturization is desired to be solved by the present invention.

One primary objective of the present invention is to provide an optical fiber module having functions of wavelength division and enabling the whole volume thereof to be miniaturized.

For achieving the above-mentioned objective, one technical solution provided by the present invention is to provide an optical fiber module including a main body and an optical conducting set.

One surface of the main body is formed with a first recess set and an accommodation groove, the first recess set is formed with a first reflection slot and a first lens slot, the main body is formed with a first reflection plane on a surface of the first reflection slot, the first lens slot is formed a surface of the main body opposite to the first reflection slot, the main body is disposed with a first lens set on a surface of the first lens slot and located close to the first reflection slot, the first lens set is substantially and mutually aligned with the first reflection plane, and the main body is disposed with a third lens located close to the accommodation groove.

The optical conducting set is disposed in the accommodation groove of the main body and includes a base material and at least one optical conducting member, one surface of the base material is formed with an optical reflection plane and an optical pervious plane, the base material is formed with a reflection layer, used for reflecting a light source, on the surface where the optical reflection plane is formed, and the optical pervious plane is substantially corresponding to the third lens of the main body, the optical conducting member is disposed on a surface of the base material opposite to the optical reflection plane, the optical conducting member is respectively formed with a film layer having a wavelength selecting property, thus the film layer allows a light source with different wavelengths to pass and allows light sources with other wavelengths to be reflected.

According to one embodiment of the present invention, in the optical finer module, a hollow optical fiber guiding column is protrudingly disposed in the main body and oriented towards the third lens, and the third lens is corresponding to the optical fiber guiding column.

According to one embodiment of the present invention, in the optical finer module, the main body is formed through a plastic injecting means.

According to one embodiment of the present invention, in the optical finer module, a first included angle Θ is formed between the first reflection slot and the accommodation groove in the horizontal direction.

According to one embodiment of the present invention, in the optical finer module, the first lens set includes a plurality of first lenses, so that the plural first lenses are able to be respectively corresponding to the optical conducting member via the first reflection plane of the main body.

According to one embodiment of the present invention, in the optical finer module, the lenses are defined as a converging or a collimating lens according to the different optical paths, wherein, the first lens and the second lens are the collimating lenses when the optical path is defined in a normal direction.

According to one embodiment of the present invention, in the optical finer module, the lenses are defined as a converging or a collimating lens according to the different optical paths, wherein, the third lens is defined as the converging lens when the optical path is in a normal direction.

According to one embodiment of the present invention, in the optical finer module, the optical conducting member is a filter plate.

For achieving the above-mentioned objective, another technical solution provided by the present invention is to provide an optical fiber module including a main body and an optical conducting set.

One surface of the main body is formed with a first recess set, a second recess set and an accommodation groove, the first recess set is formed with a first reflection slot and a first lens slot, the main body is formed with a first reflection plane on a surface of the first reflection slot, the first lens slot is formed a surface of the main body opposite to the first reflection slot, the main body is disposed with a first lens set on a surface of the first lens slot and located close to the first reflection slot, the first lens set is substantially and mutually aligned with the first reflection plane; the second recess set is formed with a second reflection slot and a second lens slot, the main body is formed with a second reflection plane on a surface of the second reflection slot, the second lens slot is formed a surface of the main body opposite to the second reflection slot, the main body is disposed with a second lens set on a surface of the second lens slot and located close to the second reflection slot, the second lens set is substantially and mutually aligned with the second reflection plane, and the main body is disposed with a third lens located close to the accommodation groove.

The optical conducting set is disposed in the accommodation groove of the main body and includes a base material and at least two optical conducting members, one surface of the base material is formed with an optical pervious plane, the optical pervious plane is substantially corresponding to the third lens of the main body, the optical conducting members are respectively disposed on a surface where the optical pervious plane is formed and on another surface opposite to the optical pervious plane of the base material, connecting locations of the optical conducting members and the base material are respectively formed with at least one film layer, the film layer allows a light source with different wavelengths to pass and meanwhile allows light sources with other wavelengths to be reflected.

According to one embodiment of the present invention, in the optical finer module, a hollow optical fiber guiding column is protrudingly disposed in the main body and oriented towards the third lens, and the third lens is corresponding to the optical fiber guiding column.

According to one embodiment of the present invention, in the optical finer module, the main body is formed through a plastic injecting means.

According to one embodiment of the present invention, in the optical finer module, a first included angle Θ is formed between the first reflection slot and the accommodation groove in the horizontal direction.

According to one embodiment of the present invention, in the optical finer module, a second included angle Θ is formed between the second reflection slot and the accommodation groove in the horizontal direction.

According to one embodiment of the present invention, in the optical finer module, the first included angle Θ is substantially equal to the second included angle Θ.

According to one embodiment of the present invention, in the optical finer module, the first lens set includes a plurality of first lenses, so that the plural first lenses are able to be respectively corresponding to the optical conducting member via the first reflection plane of the main body.

According to one embodiment of the present invention, in the optical finer module, the second lens set includes a plurality of second lenses, so that the plural second lenses are able to be respectively corresponding to the optical conducting members via the second reflection plane of the main body.

According to one embodiment of the present invention, in the optical finer module, the lenses are defined as a converging or a collimating lens according to the different optical paths, wherein, the first lens and the second lens are defined as the collimating lenses when the optical path is in a normal direction.

According to one embodiment of the present invention, in the optical finer module, the lenses are defined as a converging or a collimating lens according to the different optical paths, wherein, the third lens is defined as the converging lens when the optical path is defined in the normal direction.

According to one embodiment of the present invention, in the optical finer module, the optical conducting member is a filter plate.

DESCRIPTION OF MAIN COMPONENT SYMBOLS

Figure 1:
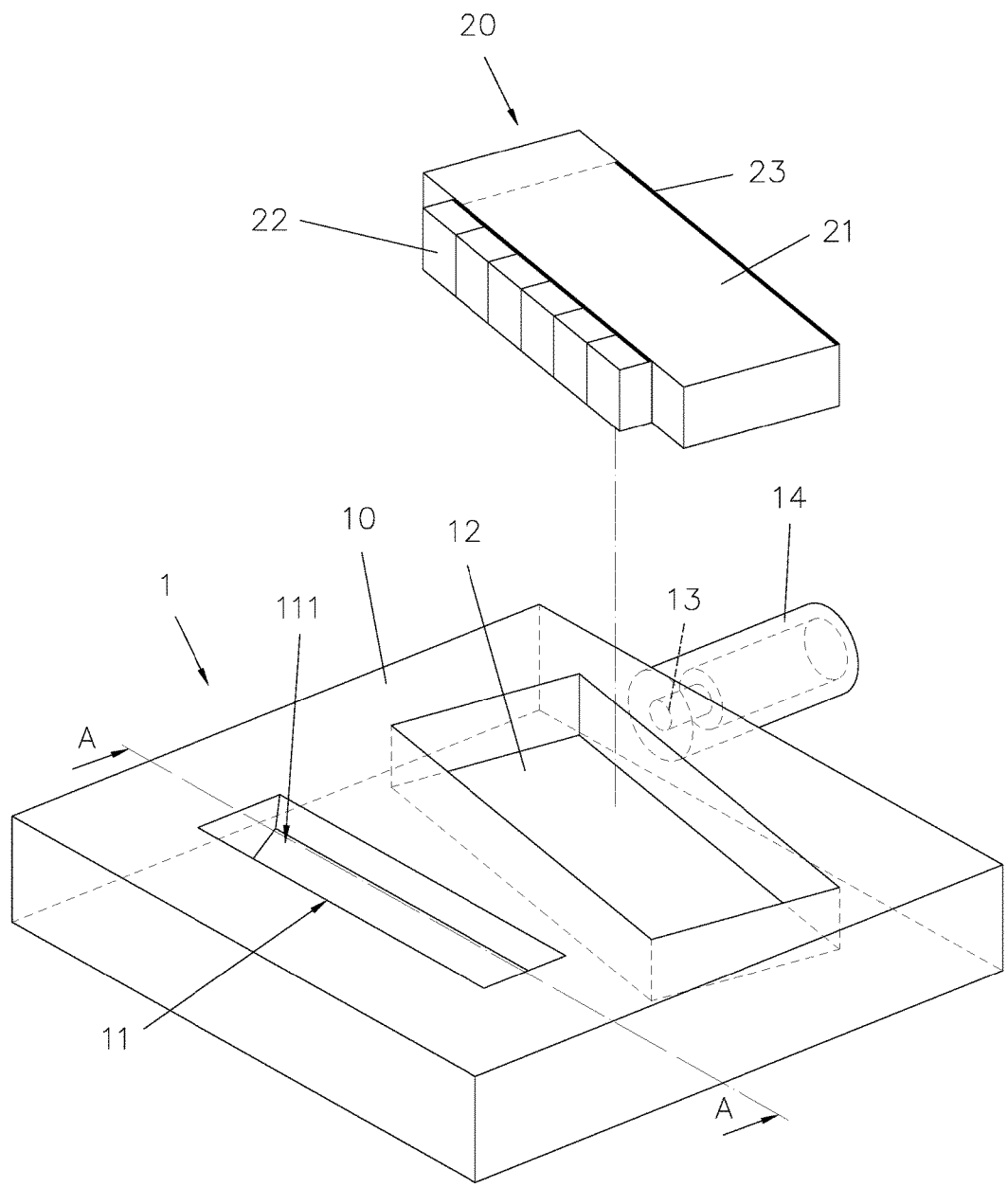
FIG. 1 is a perspective exploded view showing an optical fiber module according to one embodiment of the present invention.
Figure 2:
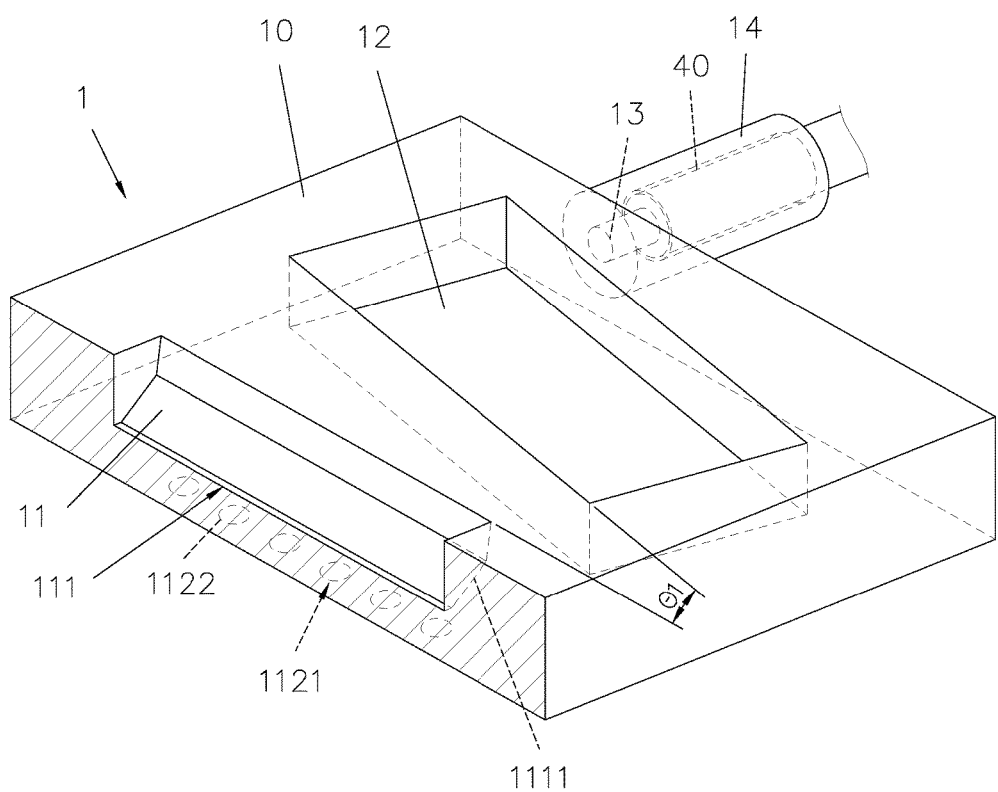
FIG. 2 is a perspective view showing a main body of the optical fiber module according to one embodiment of the present invention.
Figure 3:
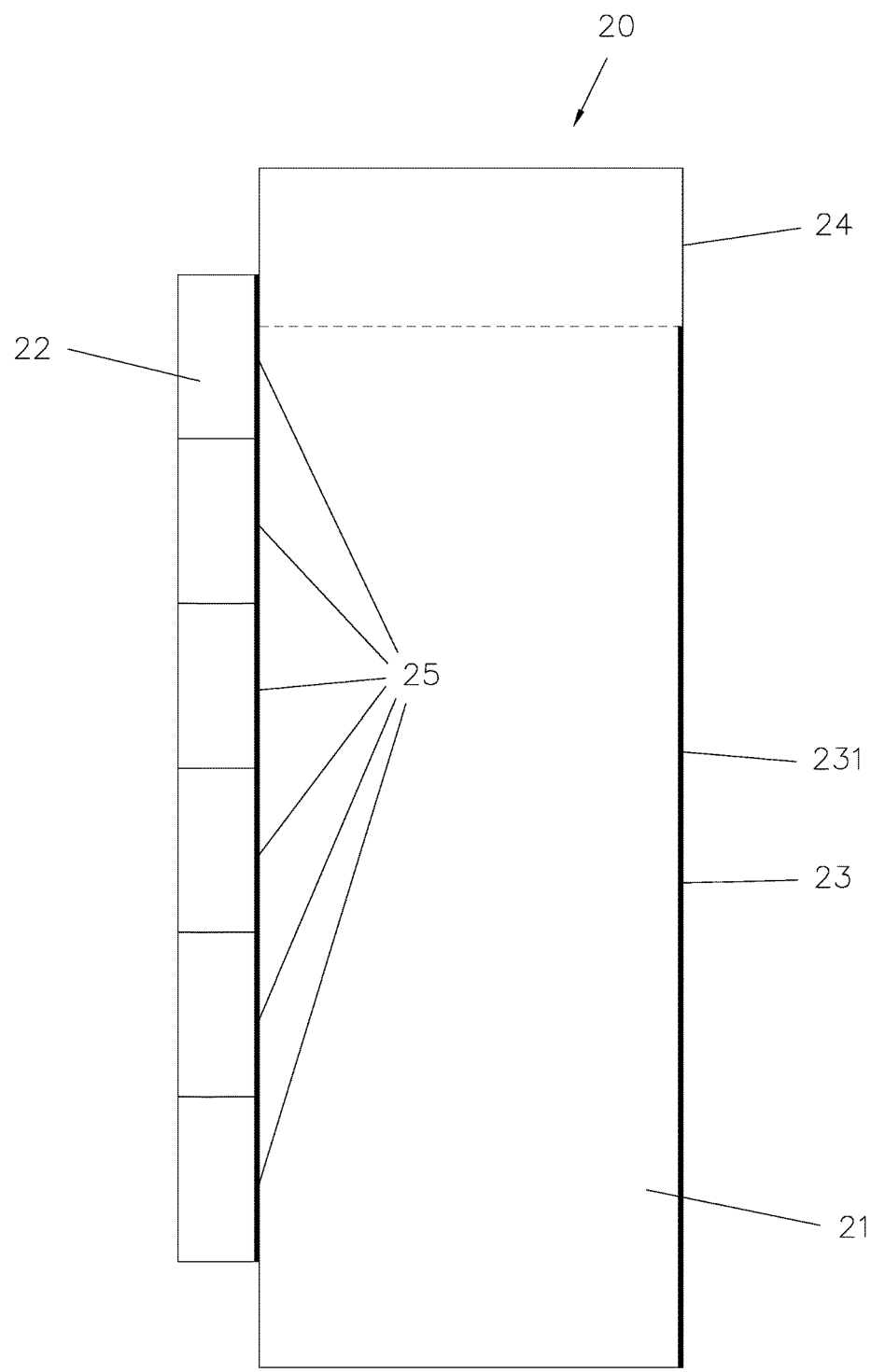
FIG. 3 is a top view showing an optical conducting set of the optical fiber module according to one embodiment of the present invention.
Figure 4:
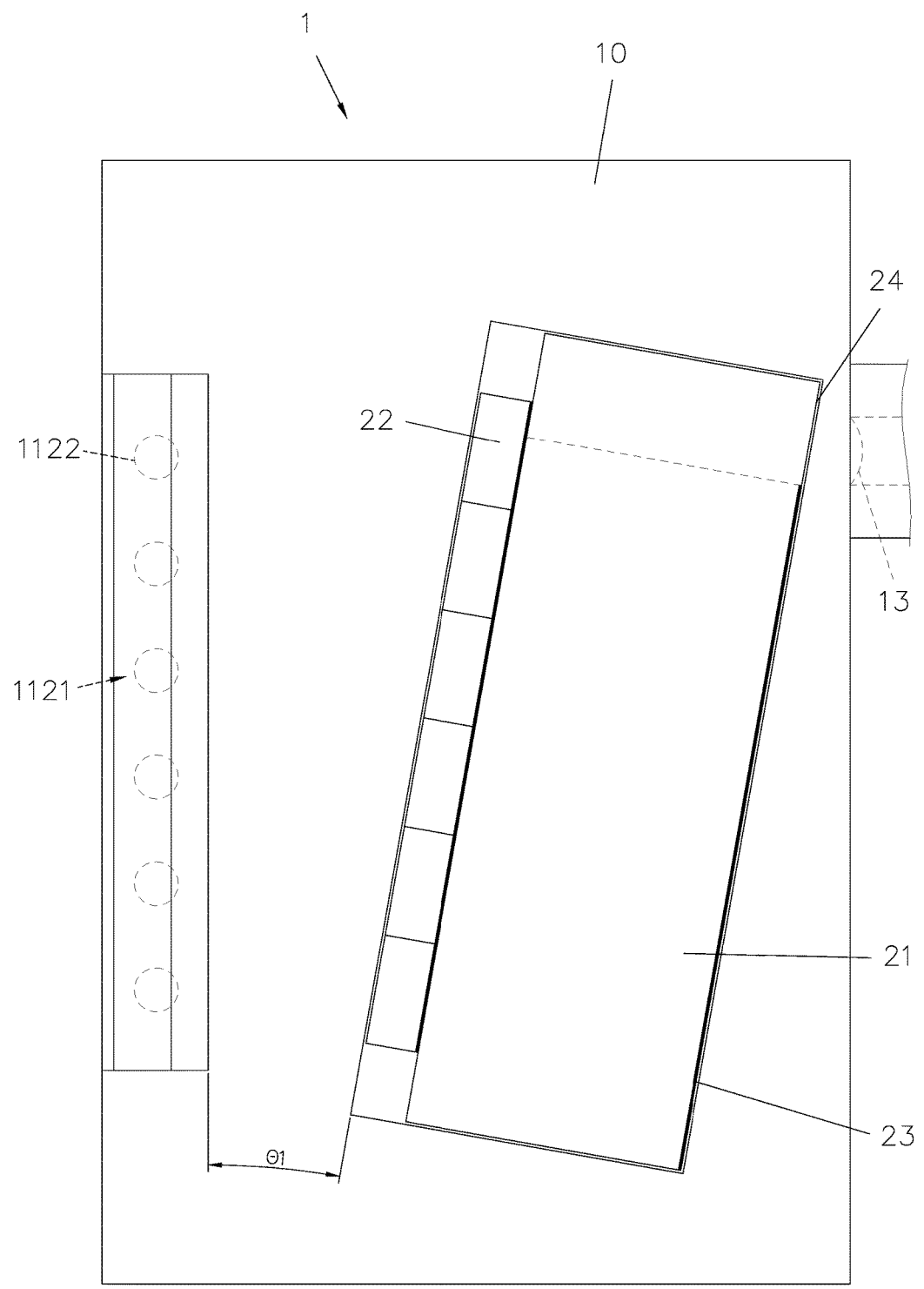
FIG. 4 is a top view showing the assembly of the optical fiber module according to one embodiment of the present invention.

1 Optical fiber module
10, 10' Main body
11, 11' First recess set
12, 12' Accommodation groove
111, 111' First reflection slot
1111, 1111' First reflection plane
112, 112' First lens slot
1121, 1121' First lens set
1122, 1122' First lens
13, 13' Third lens
14, 14' Optical fiber guiding column
20, 20' Optical conducting set
21, 21' Base material
22, 22' Optical conducting member
23, 23' Full reflection plane
231 Reflection layer
24, 24' Optical pervious plane
31 Second recess set
311 Second reflection slot
3111 Second reflection plane
312 Second lens slot
3121 Second lens set
3122 Second lens
33 33' Light detecting unit
25, 25' Film layer
40 Optical fiber
$\Theta 1, \Theta 2$ Included angle
$\lambda a, \lambda b, \lambda c, \lambda d$ Integrated light source
$\lambda a1 \sim \lambda a6, \lambda b1 \sim \lambda b6, \lambda c1 \sim \lambda c11, \lambda d1 \sim \lambda d11$ Light source
A Printed circuit board

DETAILED DESCRIPTION OF THE PREFERRED EMBODIMENT

Please refer from FIG. 1 to FIG. 5, according to a first embodiment, the present invention discloses an optical fiber module 1 including a main body 10 and an optical conducting set 20.

The main body 10 is formed with a first recess set 11 and an accommodation groove 12, the first recess set 11 includes a first reflection slot 111 and a first lens slot 112, the first reflection slot 111 is formed on the same of the main body 10 where the accommodation groove 12 is formed, and a first included angle Θ1 is formed between the first reflection slot 111 and the accommodation groove 12 based on a horizontal plane; the first reflection slot 111 is formed as a polygonal concave slot, and the main body 10 is formed with a first reflection plane 1111 on a surface of the first reflection slot 111, the first reflection plane 1111 is formed as a fully reflection plane, the first lens slot 112 is formed a surface on the main body 10 opposite to the first reflection slot 111, the main body 10 is disposed with a lens set 1121 on a surface of the first lens slot 112 and located close to the first reflection slot 111, according to this embodiment, the lens set 1121 includes a plurality of first lenses 1122, the first lenses 1122 are substantially and respectively aligned with the first reflection plane 1111, each of the first lenses 1122 is a collimating lens, and the collimating lens is a convex lens. The main body 10 is formed through a plastic injecting means so as to be integrally formed as one piece, but what shall be addressed is that the scope of the present invention is not limited to the above-mentioned means. The main body 10 is disposed with a third lens 13 located close to the accommodation groove 12, a hollow optical fiber guiding column 14 is protrudingly disposed in the main body 10 and oriented towards the third lens 13, and the third lens 13 is substantially corresponding to the optical fiber guiding column 14.

The optical conducting set 20 is disposed in the accommodation groove 12 of the main body 10, the optical conducting set 20 includes a base material 21 and a plurality of optical conducting members 22, each of the optical conducting members 22 is a filtering plate, and each of the optical conducting members 22 allows a light source with a certain wavelength to pass and meanwhile allows other light sources with different wavelengths to be reflected, respectively.

The base material 21 is formed with a full reflection plane 23 and an optical pervious plane 24 on a surface opposite to the first reflection slot 111, a surface of the full reflection plane 23 is coated with a reflection layer 231 (not shown in figures) made of a material with a high reflection rate, the reflection layer 231 is able to fully reflect the light source, the optical pervious plane 24 is corresponding to the optical fiber guiding column 14 of the main body 10, the optical pervious plane 24 allows the light source to emit or enter, wherein the base material 21 is a transparent material, such as transparent glass or transparent plastic.

One surface of the optical conducting member 22 is engaged with one surface of the base material 21 opposite to the full reflection plane 23, the first reflection plane 1111 of the main body 10 is substantially and respectively corresponding to the plural first lenses 1122 of the first lens slot 112 via the optical conducting members 22, and the surface of the optical conducting member 22, which is desired to be adhered with the base material 21 with a pointy gluing means, is provided with a film layer 25 having a wavelength selecting property, in other words a coated film. The film layer 25 is able to allow a light source with a certain wavelength to pass and allow other light sources with different wavelengths to be reflected, wherein the optical conducting member 22 is a filter plate. The optical conducting set 20 can be accommodated in the accommodation groove 12 with a pointy gluing means, wherein the length, the width and the height of the accommodation groove 12 are slightly greater or equal to the optical conducting set 20, a groove wall of the accommodation groove 12 can be served as a position aligning datum surface while being assembled. When the optical conducting set 20 is assembled, if there is any alignment deviation which needs to be adjusted, the adjustment operation can be processed in the accommodation groove 12 for correcting an alignment deviation of optical path.

Please refer to FIG. 3, FIG. 4, FIG. 5 and FIG. 6, when light sources λa1~λa6 with different wavelengths are collimated by the first lens 1122 and reflected by the first reflection plane 1111 of the main body 10, the fully-reflected light sources λa1~λa6 are allowed to respectively pass the optical conducting members 22 for entering the base material 21, the light sources λa1~λa6 having different wavelengths, which have already entered the base material 21, are refracted by the full reflection plane 23 and the film layer 25 for multiple times, thereby being formed as an integrated light source λa, the integrated light source λa is able to emit out of the optical pervious plane 24 then be converged by the third lens 13 for being coupled so as to be conducted in an optical fiber 40.

Wherein, after the light sources λa1~λa6 are collimated by the first lenses 1122 then refracted by the first reflection plane 1111, in order to enable the light source to be internally fully reflected, a principle of $\sin(\pi/2-\phi)>1/n$ must be satisfied, the $\phi$ is an inclined angle, which is usually defined at 45 degrees, and the n is a material reflection rate, which is usually defined as greater than 1.

Figure 5:
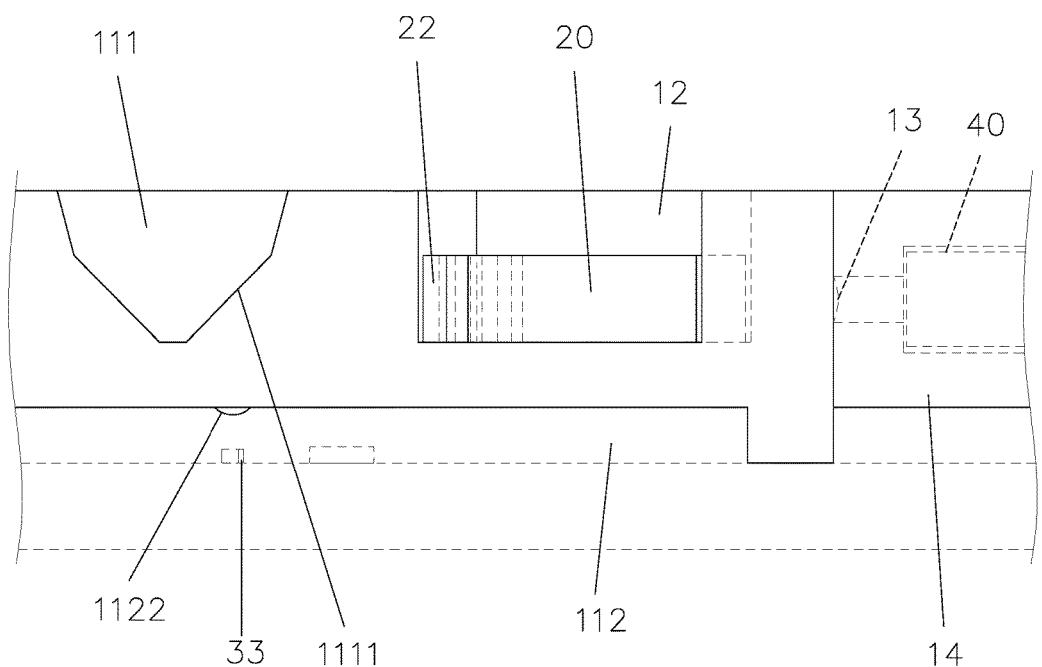
FIG. 5 is a partially cross sectional view showing the optical fiber module according to one embodiment of the present invention.
Figure 6:
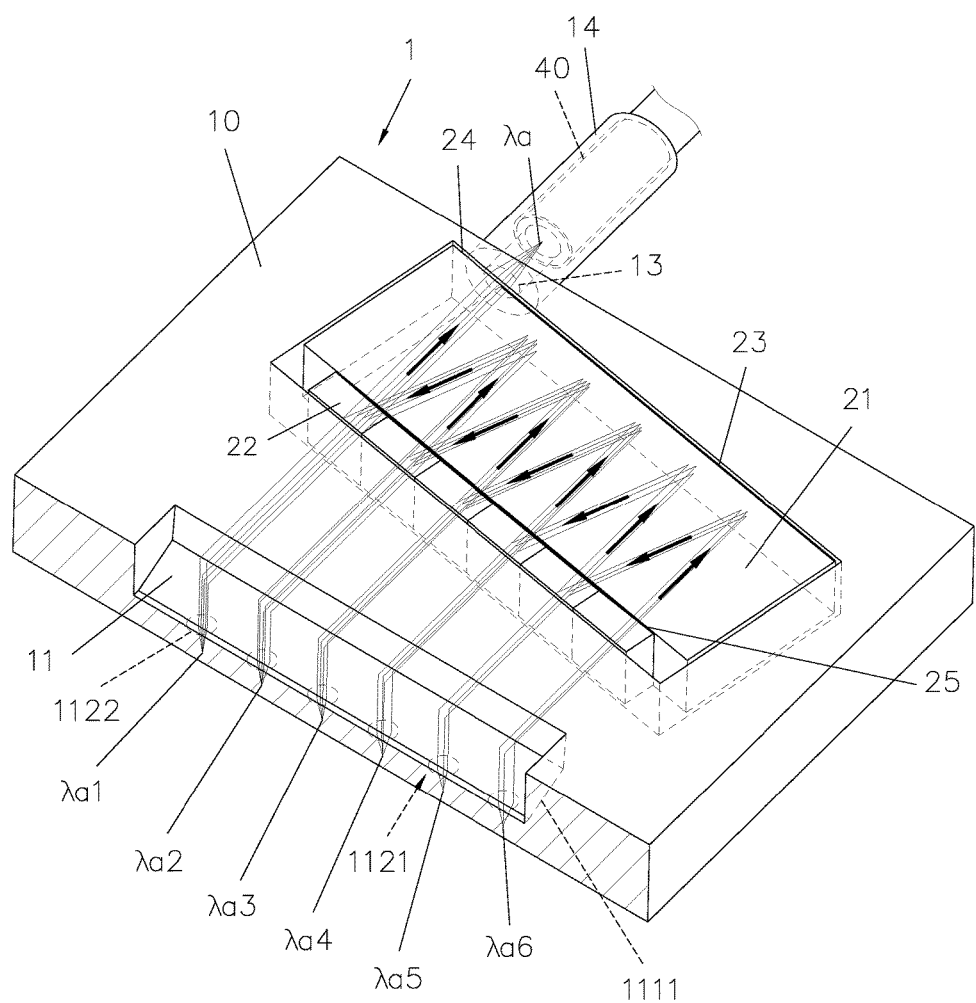
FIG. 6 is a schematic view showing a normal optical path of the optical fiber module according to one embodiment of the present invention.
Figure 7:
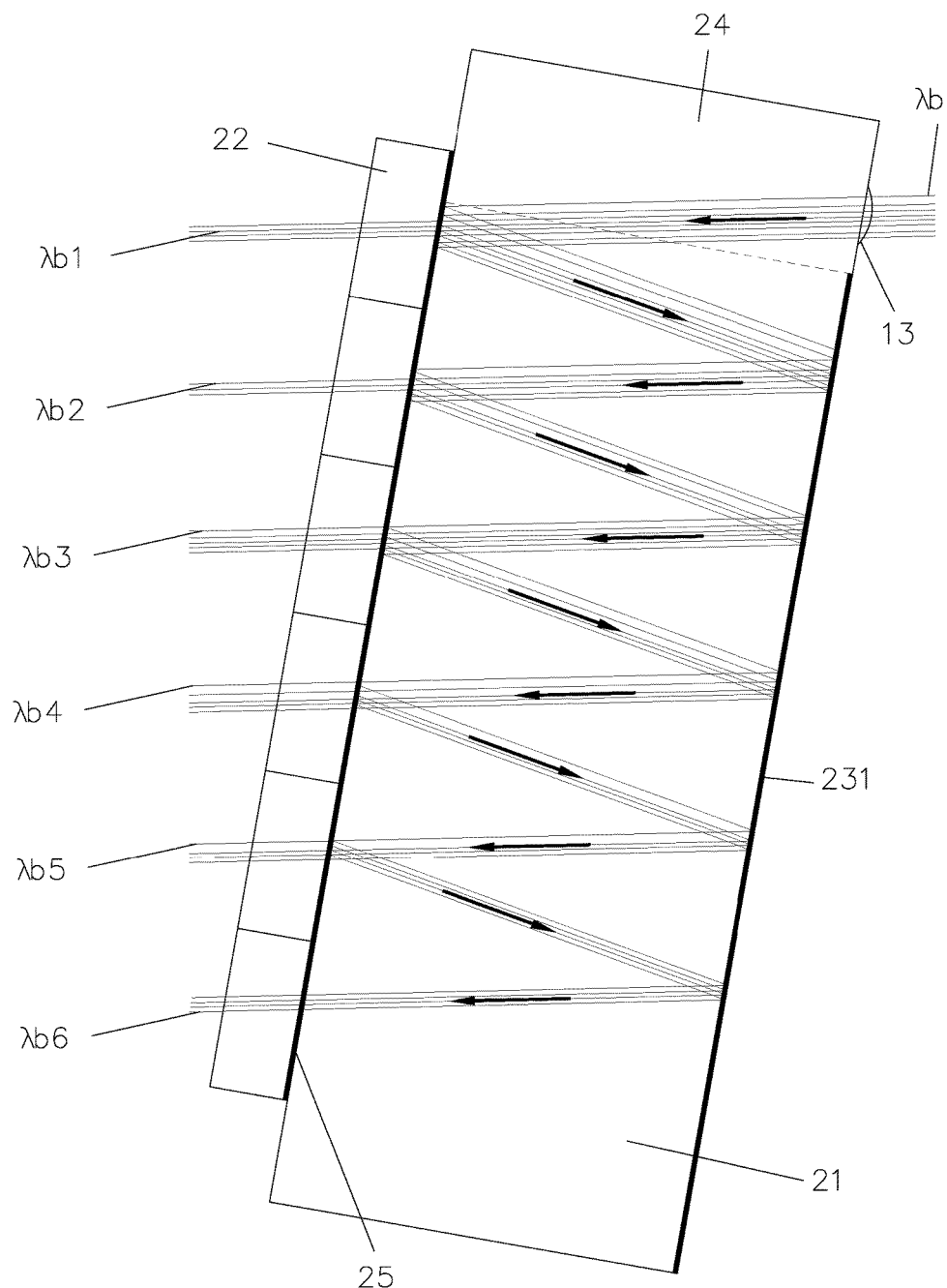
FIG. 7 is a schematic view showing a reverse optical path of the optical fiber module used for an optical detecting operation according to one embodiment of the present invention.

Please refer to FIG. 1, FIG. 5 and FIG. 7, the optical path of the optical fiber module 1 disclosed in the present invention is provided with a reversibility which can be served to a light detecting unit 33 for performing an optical detecting operation, according to a second embodiment of the present invention, wherein the structure disclosed in the second embodiment is similar to the structure disclosed in the first embodiment, and the same components shared by the second embodiment and the first embedment are provided with the codes. The difference between the second embodiment and the first embodiment is that a light source adopted in the second embodiment is a light source λb having different wavelengths, the light source λb is collimated by the third lens 13 then allowed to penetrate the optical pervious plane 24 so as to enter the base material 21.

When the light source λb passes through the base material 21, the light source λb is refracted by the reflection layer 231 and filtered by the film layer 25, so that the light source λb having different wavelengths is able to emit out from the corresponding optical conducting members 22, the light source λb emitted out from the optical conducting members 22 is refracted by the first reflection plane 1111 and collimated by the first lenses 1122 then emitted out from the main body 10, lastly the incident integrated light source is separated for being formed as the light source λb having different wavelengths.

Figure 8:
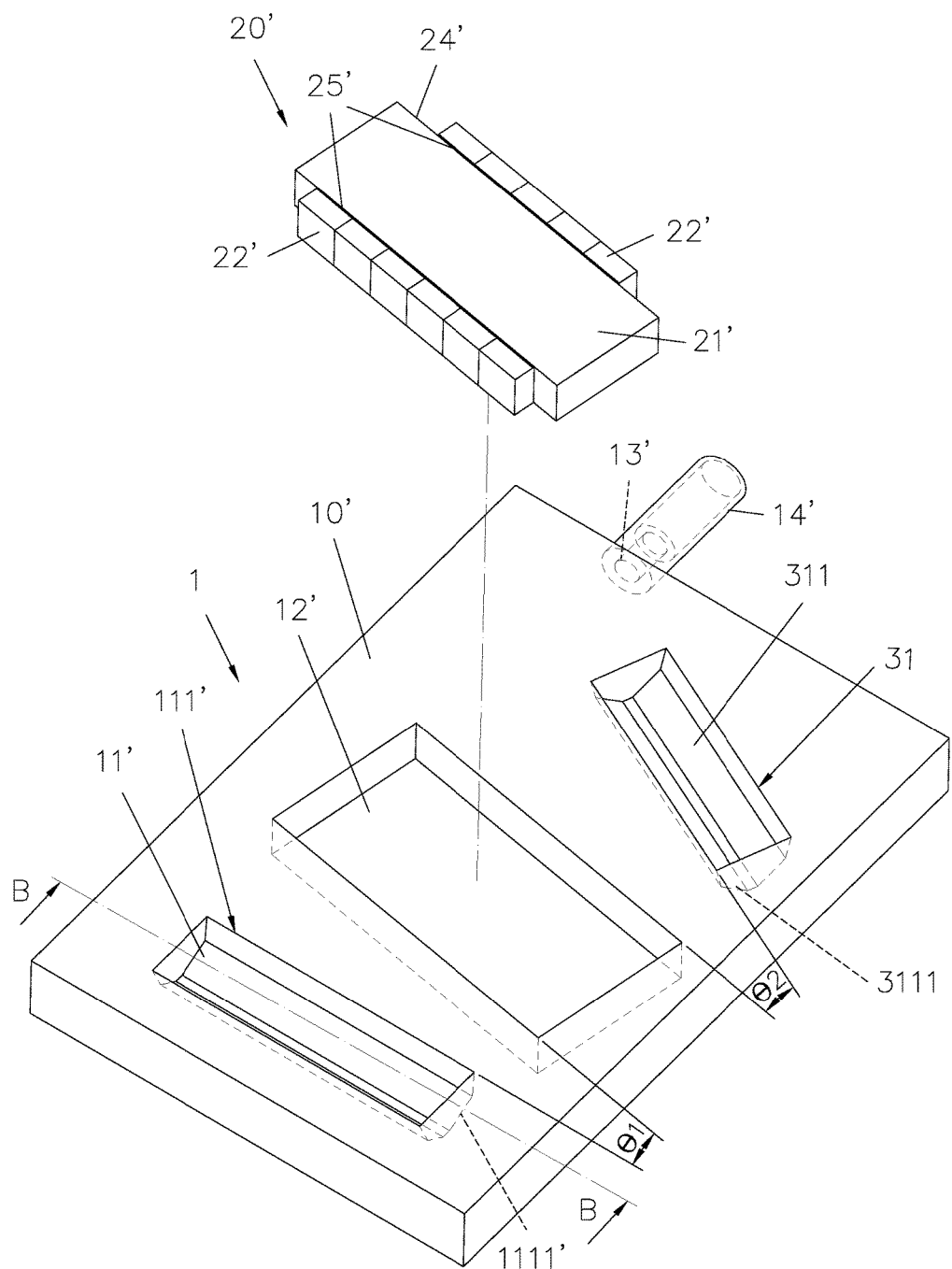
FIG. 8 is an exploded view showing a main body and an optical conducting set according another embodiment of the present invention.
Figure 9:
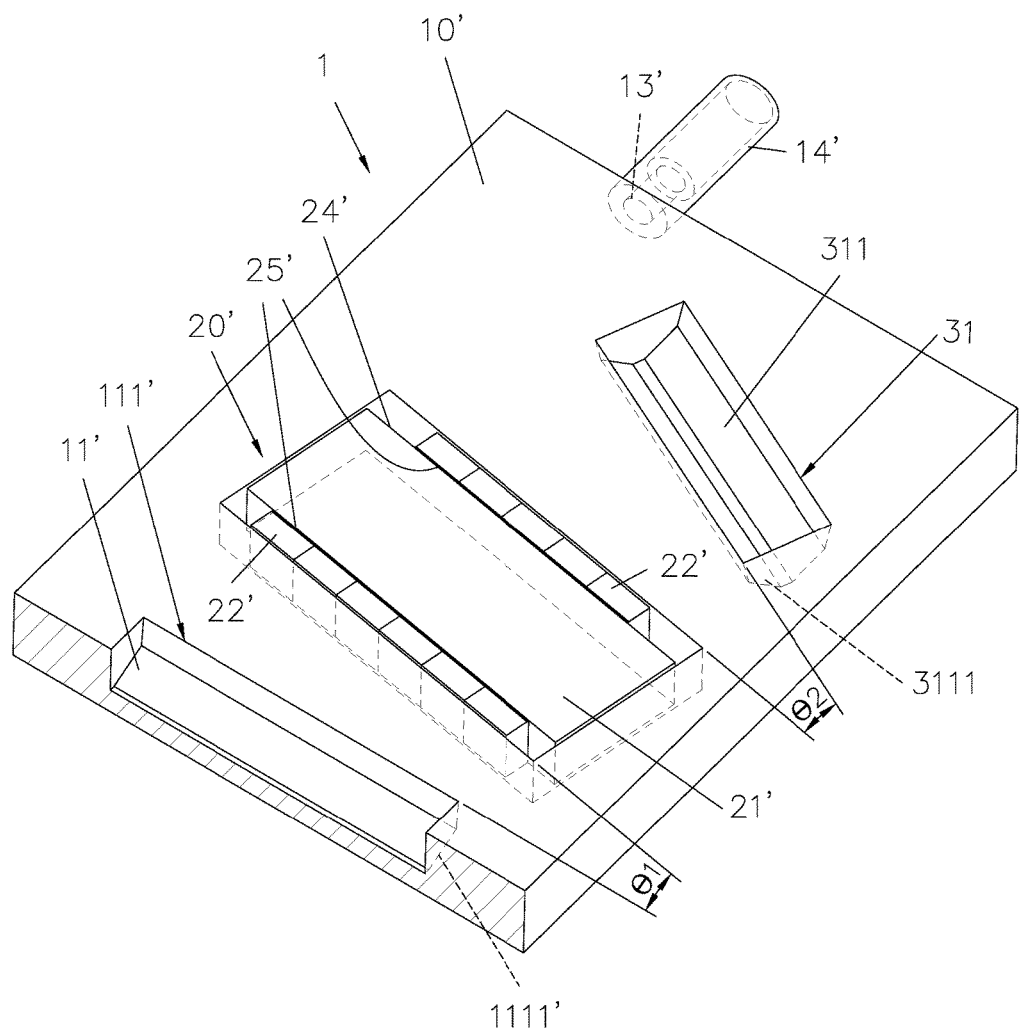
FIG. 9 is a perspective top view showing the main body and the optical conducting set of the optical fiber module being assembled according one embodiment of the present invention.
Figure 10:
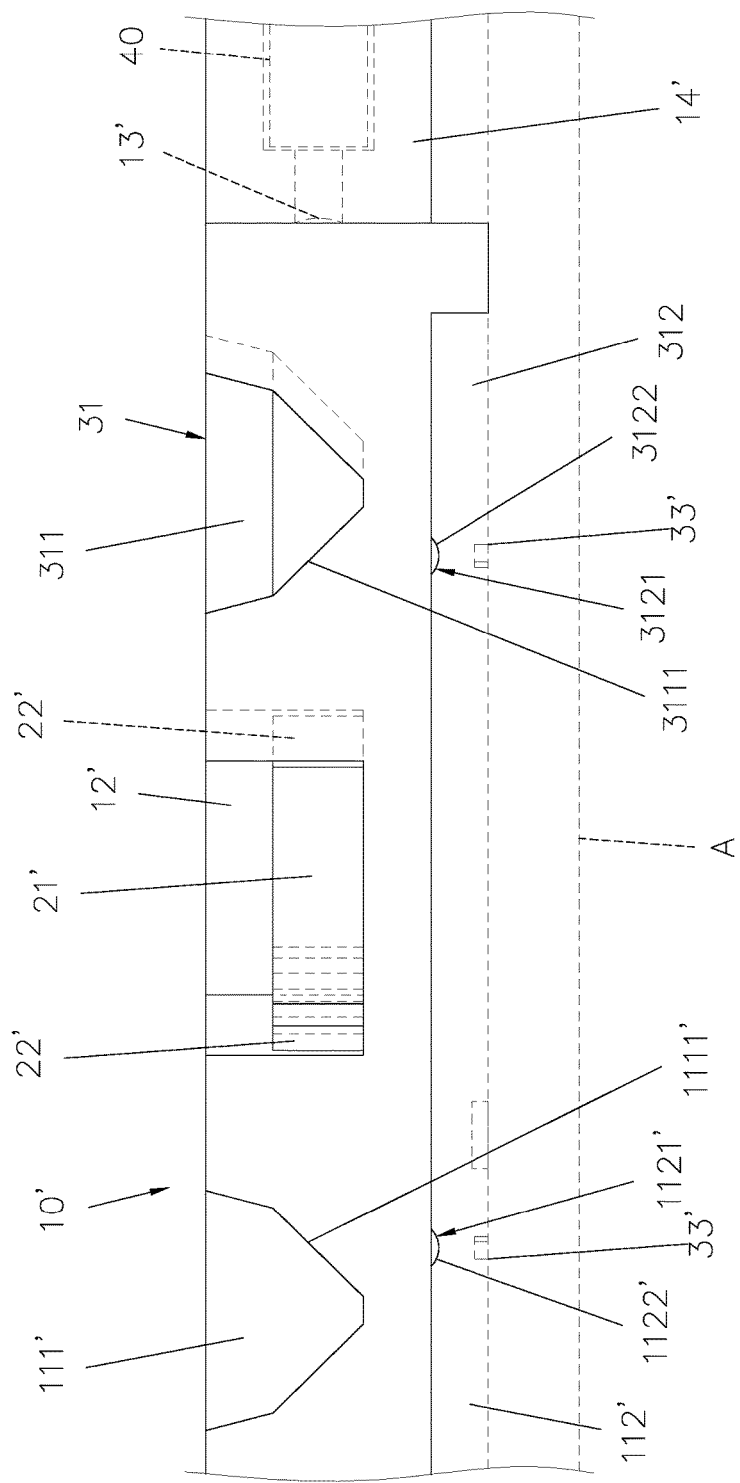
FIG. 10 is a partially cross sectional view showing the optical fiber module according to one embodiment of the present invention.

Please refer to FIG. 8 to FIG. 10, which disclose a third embodiment of the optical fiber module 1 according to the present invention, and the optical fiber module 1 includes a main body 10' and an optical conducting set 20'.

The main body 10' is formed with a first recess set 11', a second recess set 31 and an accommodation groove 12', the first recess set 11' is formed with a first reflection slot 111' and a first lens slot 112', the main body 10' is formed with a first reflection plane 1111' on a surface of the first reflection slot 111', and a first lens slot 112' is formed on a surface of the main body 10' opposite to the first reflection slot 111', the main body 10' is formed with a first lens set 1121' on a surface of the first lens slot 112' and located close to the first lens slot 1121', the first lens slot 1121' is substantially and mutually aligned with the first reflection plane 1111'; the second recess set 31 is formed with a second reflection slot 311 and a second lens slot 312, a second reflection plane 3111 is formed on a surface of the second reflection slot 311, a second lens slot is formed on the main body 10' opposite to the second reflection slot 311, the main body 10' is disposed with a second lens set 3121 on a surface of the second lens slot and located close to the second reflection slot 311, the second lens set 3121 is substantially and mutually aligned with the second reflection plane 3111, and a third lens 13' is provided at one side of the main body 10' and located close to the accommodation groove 12'.

The optical conducting set 20' is accommodated in the accommodation groove 12' of the main body 10', the optical conducting set 20' includes a base material 21' and at least two optical conducting members 22', one surface of the base material 21' is formed with an optical pervious plane 24', the optical pervious plane 24' is substantially corresponding to the third lens 13' of the main body 10', the optical conducting members 22' are respectively arranged on the base material 21' and respectively located at the same side and the opposite side relative to the optical pervious plane 24', connecting locations of the optical conducting members 22' and the base material 21' are respectively formed with at least one film layer 25', the film layer 25' allows a light source with different wavelengths to pass and meanwhile allows other light sources with other wavelengths to be reflected.

The optical conducting members 22' are respectively and substantially corresponding to the first lens 1122' of the first lens set 1121' and the second lens 3122 of the second lens set 3121 via the first reflection plane 1111' of the main body 10' and the second reflection plane 3111, the connection locations of the optical conducting members 22' and the base material 21' are respectively formed with the film layer 25', the film layer 25' allows a light source with different wavelengths to pass and meanwhile allows other light sources with other wavelengths to be reflected, wherein the optical conducting member 22' is a filter plate.

The optical conducting set 20' can be accommodated in the accommodation groove 12' with a pointy gluing means, wherein the length, the width and the height of the accommodation groove 12' are slightly greater or equal to the optical conducting set 20', a groove wall of the accommodation groove 12' can be served as a position aligning datum surface while being assembled. When the optical conducting set 20' is assembled, if there is any alignment deviation which needs to be adjusted, the adjusted operation can be processed in the accommodation groove 12' for correcting an alignment deviation of optical path.

Figure 11:
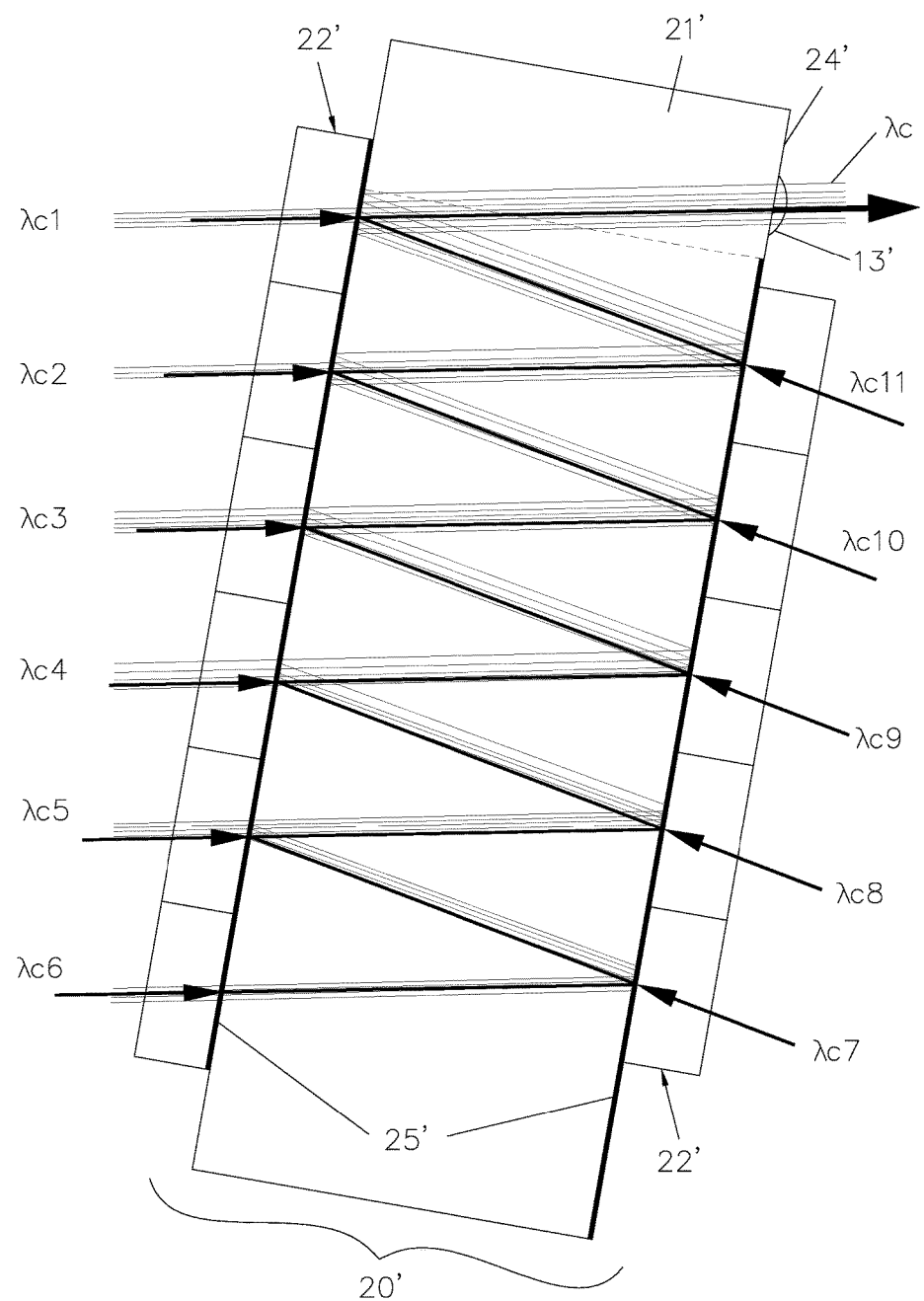
FIG. 11 is a schematic view showing an optical path of the optical fiber module according to another embodiment of the present invention.

Please refer to FIG. 10 and FIG. 11, when light sources $\lambda c1$~$\lambda c11$ with different wavelengths are respectively collimated by the first lens 1122' and the second lens 3122 and reflected by the first reflection plane 1111' of the main body 10' and the second reflection plane 3111, the reflected light sources $\lambda c1$~$\lambda c11$ are allowed to respectively pass the optical conducting members 22' for entering the base material 21', the light sources $\lambda c1$~$\lambda c11$ having different wavelengths, which have already entered the base material 21', are refracted by the film layer 25' for multiple times, thereby being formed as an integrated light source $\lambda c$, the integrated light source $\lambda c$ is able to be emitted out of the optical pervious plane 24' then be focused by the third lens 13' for being coupled so as to be conducted in the optical fiber 40 disposed inside an optical fiber guiding column 14', so that the data transmission amount can be significantly increased.

Wherein, after the light sources $\lambda c1$~$\lambda c11$ are collimated by the first lens 1122' and the second lens 3122 then refracted by the first reflection plane 1111' and the second reflection plane 3111, in order to enable the light source to be internally fully reflected, a principle of $\sin(\pi/2-\phi)>1/n$ must be satisfied, the $\phi$ is an inclined angle, which is usually defined at 45 degree, and the n is a material reflection rate, which is usually defined as greater than 1.

Figure 12:
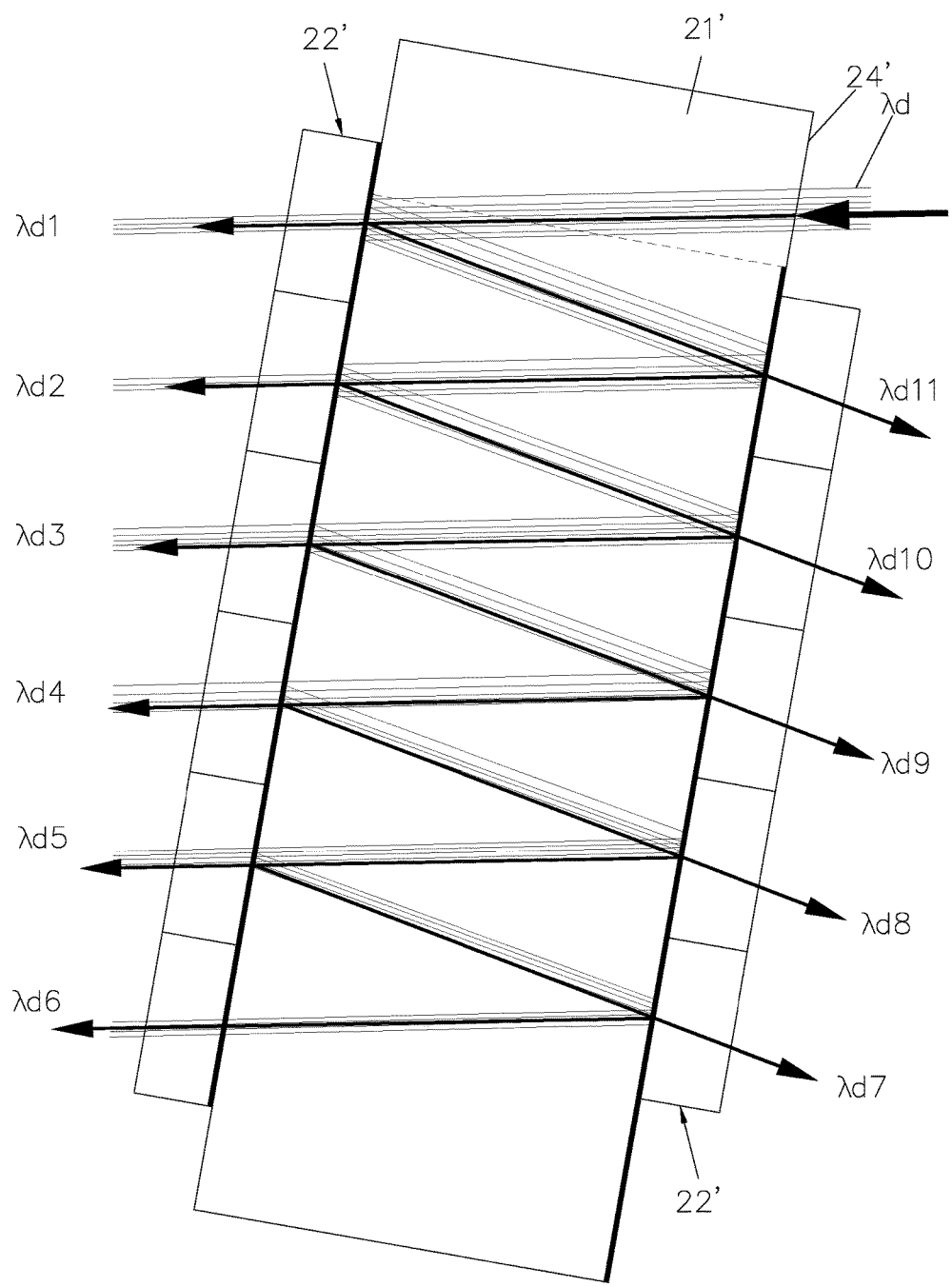
FIG. 12 is a schematic view showing a reverse optical path of the optical fiber module according to another embodiment of the present invention.

Please refer to FIG. 10 and FIG. 12, the optical path of the optical fiber module 1 disclosed in the present invention is provided with a reversibility which can be served to perform an optical detecting operation. According to a fourth embodiment of the present invention, wherein the structure disclosed in the fourth embodiment is similar to the structure disclosed in the third embodiment, and the same components shared by the fourth embodiment and the third embodiment are provided with the codes. The difference between the fourth embodiment and the third embodiment is that a light source adopted in the fourth embodiment is an integrated light source $\lambda d$ having different wavelengths, and the integrated light source $\lambda d$ is collimated by a third lens 13' then emitted out of from the optical pervious plane 24' to enter the base material 21'.

When the integrated light source $\lambda d$ passes through the base material 21', and reflected and filtered by the optical conducting members 22', the light sources $\lambda d1$~$\lambda d11$ having different wavelengths are respectively emitted out from the corresponding optical conducting members 22'. The light sources, which have already passed through the optical conducting members 22', are reflected by the first reflection plane 1111' and the second reflection plane 3111 and collimated by the first lens 1122' and the second lens 3122 then respectively emitted out from the main body 10', lastly the incident integrated light source $\lambda d$ is separated to be formed as light sources with different wavelengths, so that the light sources with different wavelengths can served to work with a light detecting unit 33' of a printed circuit board for performing a detecting operation.

Figure 13:
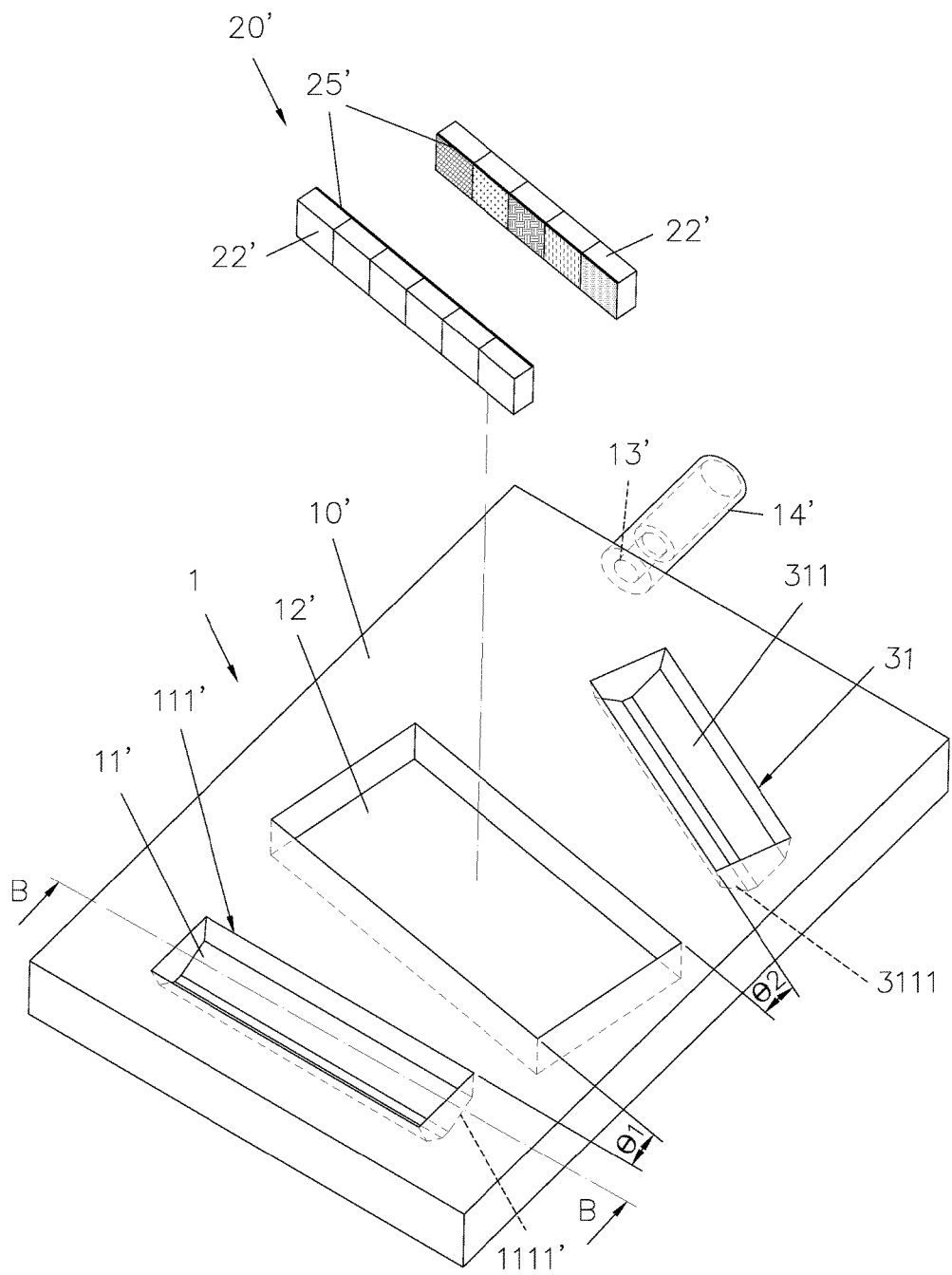
FIG. 13 is a perspective exploded view showing the main body of the optical fiber module according to another embodiment of the present invention.
Figure 14:
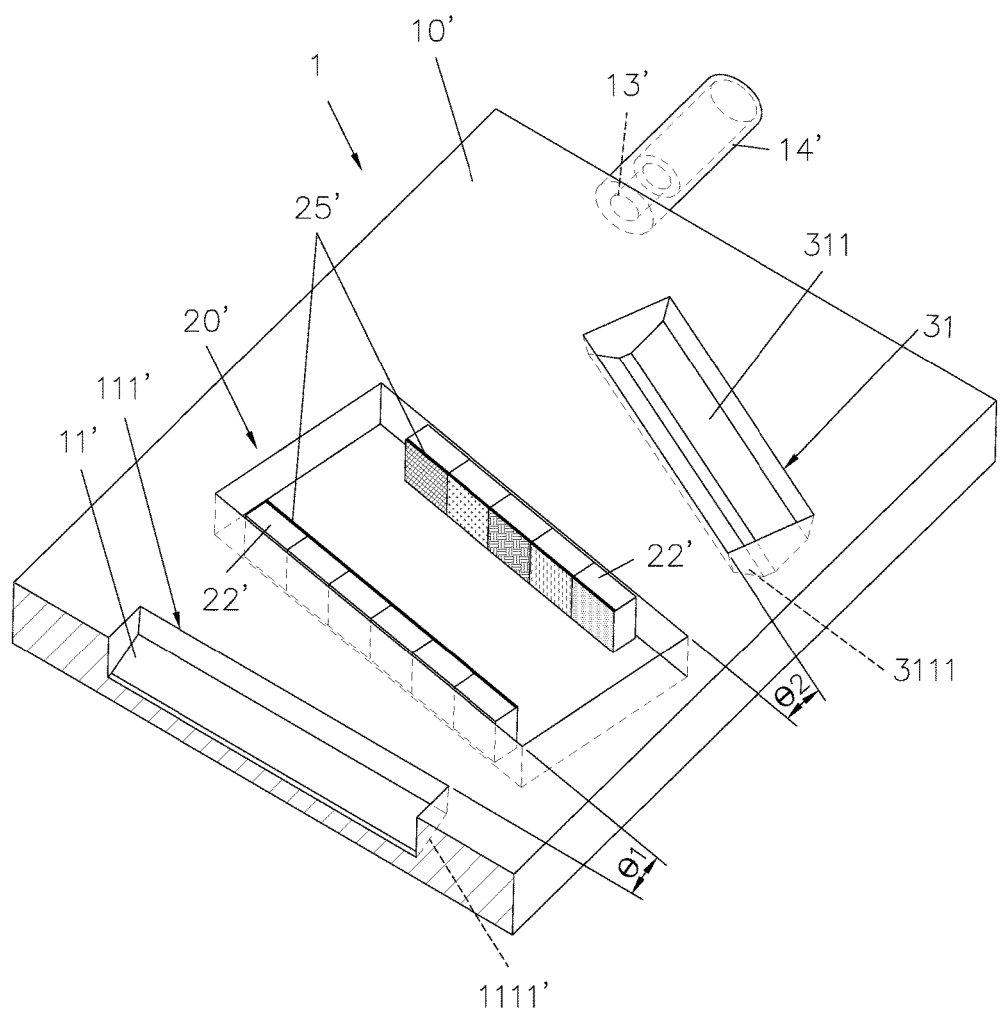
FIG. 14 is a perspective view showing the main body of the optical fiber module according to another embodiment of the present invention.

Please refer to FIG. 13 and FIG. 14, which disclose a fifth embodiment of the optical fiber module 1 provided by the present invention, according to the fifth embodiment of the present invention, the structure disclosed herein is similar to the structure disclosed in the third embodiment (as shown in FIG. 8), and the same components shared by the fifth embodiment and the third embodiment are provided with the codes. The difference between the fifth embodiment and the third embodiment is that the base material 21' of the optical conducting member 22' is not provided, in other words the two optical conducting members 22' are directly adhered in two lateral surfaces of the accommodation groove 12' with a pointy gluing means, the first reflection surface 1111' is corresponding to the second reflection surface 3111, two sides of the accommodation groove 12' corresponding to the surfaces where the two optical conducting members 22' are arranged are respectively formed with a film layer 25', so that the optical conducting member 22' is provided with the film layer 25' having a wavelength selecting property, the transmittance spectrum is defined as allowing the corresponding wavelength to pass and allowing other wavelengths to be reflected. As shown in figures, the patterns of the film layer 25' are merely served for illustrations and shall not deems as the status of the film layer to be claimed, and the film layer 25' is a coated film. The air existed in the interval between the optical conducting members 22' arranged at two opposite sides is served as a media, the light source with different wavelengths is allowed to pass and meanwhile light sources with other wavelengths are allowed to be reflected. As such, the optical path can be reflected back and forth for being coupled, the optical paths with different wavelengths can be converged and coupled for being outputted from the optical fiber 40 disposed in the optical fiber guiding column 14', thereby significantly increasing the data transmission amount, and the optical path having the base material 21' being removed can also be served to achieve a wavelength division effect.

Moreover, according to the present invention, the optical fiber module can be adhered with a printed circuit board A with a chip on board (COB) means.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An optical fiber module, including:
   a main body, having one surface thereof formed with a first recess set and an accommodation groove, wherein the first recess set is formed with a first reflection slot and a first lens slot, the main body is formed with a first reflection plane on a surface of the first reflection slot, the first lens slot is formed on a surface of the main body opposite to the first reflection slot, the main body is disposed with a first lens set on a surface of the first lens slot and located close to the first reflection slot, the first lens set is substantially and mutually aligned with the first reflection plane, and the main body is disposed with a third lens located close to the accommodation groove; and
   an optical conducting set, disposed in the accommodation groove of the main body and including a base material and an optical conducting member, wherein one surface of the base material is formed with an optical reflection plane and an optical pervious plane, the base material is formed with a reflection layer, used for reflecting a light source, on the surface where the optical reflection plane is formed, and the optical pervious plane is substantially corresponding to the third lens of the main body, the optical conducting member is disposed on a surface of the base material opposite to the optical reflection plane, connecting a location of the optical conducting member and the base material are respectively formed with at least one film layer, the film layer allows a light source with different wavelengths to pass and meanwhile allows light sources with other wavelengths to be reflected.

2. The optical fiber module as claimed in claim 1, wherein a hollow optical fiber guiding column is protrudingly disposed in the main body and oriented towards the third lens, and the third lens is corresponding to the optical fiber guiding column.

3. The optical fiber module as claimed in claim 1, wherein the main body is formed through a plastic injecting means.

4. The optical fiber module as claimed in claim 1, wherein a first included angle is formed between a boundary surface of the first reflection slot and a boundary surface of the accommodation groove.

5. The optical fiber module as claimed in claim 1, wherein the first lens set includes a plurality of first lenses, so that the plural first lenses are able to be respectively corresponding to the optical conducting member via the first reflection plane of the main body.

6. The optical fiber module as claimed in claim 5, wherein the first lens is a collimating lens.

7. The optical fiber module as claimed in claim 1, wherein the third lens is a converging lens.

8. The optical fiber module as claimed in claim 1, wherein the main body is made of a transparent material.

9. The optical fiber module as claimed in claim 1, wherein the optical conducting member is consisted of a plurality of filter plates.

10. An optical fiber module, including:
    a main body having one surface thereof formed with a first recess set and an accommodation groove, and another surface thereof formed with a second recess set, wherein the first recess set is formed with a first reflection slot and a first lens slot, the main body is formed with a first reflection plane on a surface of the first reflection slot, the first lens slot is formed on a surface of the main body opposite to the first reflection slot, the main body is disposed with a first lens set on a surface of the first lens slot and located close to the first reflection slot, the first lens set is substantially and mutually aligned with the first reflection plane, the second recess set is formed with a second reflection slot and a second lens slot, the main body is formed with a second reflection plane on a surface of the second reflection slot, the second lens slot is formed on a surface of the main body opposite to the second reflection slot, the main body is disposed with a second lens set on a surface of the second lens slot and located close to the second reflection slot, the second lens set is substantially and mutually aligned with the second reflection plane, and the main body is disposed with a third lens located close to the accommodation groove; and
    an optical conducting set, disposed in the accommodation groove of the main body and including a base material and at least two optical conducting members, wherein one surface of the base material is formed with an optical pervious plane, the optical pervious plane is substantially corresponding to the third lens of the main body, the optical conducting members are respectively disposed on a surface where the optical pervious plane is formed and on another surface opposite to the optical pervious plane of the base material, connecting locations of the optical conducting members and the base material are respectively formed with at least one film layer, the film layer allows a light source with different wavelengths to pass and meanwhile allows light sources with other wavelengths to be reflected.

11. The optical fiber module as claimed in claim 10, wherein a hollow optical fiber guiding column is protrudingly disposed in the main body and oriented towards the third lens, and the third lens is corresponding to the optical fiber guiding column.

12. The optical fiber module as claimed in claim 10, wherein the main body is formed through a plastic injecting means.

13. The optical fiber module as claimed in claim 10, wherein a first included angle is formed between a boundary surface of the first reflection slot and a boundary surface of the accommodation groove.

14. The optical fiber module as claimed in claim 10, wherein a second included angle is formed between a boundary surface of the second reflection slot and a boundary surface of the accommodation groove.

15. The optical fiber module as claimed in claim 10, wherein a first included angle is formed between a boundary surface of the first reflection slot and a boundary surface of the accommodation groove, a second included angle is formed between a boundary surface of the second reflection slot and the boundary surface of the accommodation groove, and the first included angle is substantially equal to the second included angle.

16. The optical fiber module as claimed in claim 10, wherein the first lens set and the second lens set respectively includes a plurality of lenses, so that the plural lenses are able to be respectively corresponding to the optical conducting members via the first reflection plane and the second reflection plane of the main body.

17. The optical fiber module as claimed in claim 16, wherein the lens is a collimating lens.

18. The optical fiber module as claimed in claim 10, wherein the third lens is a converging lens.

19. The optical fiber module as claimed in claim 10, wherein the main body is made of a transparent material.

20. The optical fiber module as claimed in claim 10, wherein each optical conducting member is consisted of a plurality of filter plates.

21. An optical fiber module, including:
a main body having one surface thereof formed with a first recess set and an accommodation groove, and another surface thereof formed with a second recess set, wherein the first recess set is formed with a first reflection slot and a first lens slot, the main body is formed with a first reflection plane on a surface of the first reflection slot, the first lens slot is formed on a surface of the main body opposite to the first reflection slot, the main body is disposed with a first lens set on a surface of the first lens slot and located close to the first reflection slot, the first lens set is substantially and mutually aligned with the first reflection plane; the second recess set is formed with a second reflection slot and a second lens slot, the main body is formed with a second reflection plane on a surface of the second reflection slot, the second lens slot is formed on a surface of the main body opposite to the second reflection slot, the main body is disposed with a second lens set on a surface of the second lens slot and located close to the second reflection slot, the second lens set is substantially and mutually aligned with the second reflection plane, and the main body is disposed with a third lens located close to the accommodation groove; and an optical conducting set, disposed in the accommodation groove of the main body and including two optical conducting members which are directly adhered at two sides of the accommodation groove so as to be corresponding to the first reflection plane and the second reflection plane, one surface of the optical conducting members at the two opposite sides of the accommodation groove is formed with a film layer, the film layer allows a light source with different wavelengths to pass and meanwhile allows light sources with other wavelengths to be reflected, so that optical paths are enabled to be reflected back and forth for being coupled, the optical paths with different wavelengths are converged and coupled for being outputted from an optical fiber disposed in an optical fiber guiding column.

* * * * *